(12) United States Patent
Seis (10) Patent No.: US 12,466,535 B2
(45) Date of Patent: Nov. 11, 2025

(54) AIRCRAFT SLIDING DOOR

(71) Applicant: FACC AG, Ried im Innkreis (AT)

(72) Inventor: Michael Seis, Ebreichsdorf (AT)

(73) Assignee: FACC AG, Ried Im Innkreis. (AT)

( * ) Notice: Subject to any disclaimer, the term of this patent is extended or adjusted under 35 U.S.C. 154(b) by 0 days.

(21) Appl. No.: 18/570,961

(22) PCT Filed: Jun. 17, 2022

(86) PCT No.: PCT/AT2022/060203
§ 371 (c)(1),
(2) Date: Dec. 15, 2023

(87) PCT Pub. No.: WO2022/261692
PCT Pub. Date: Dec. 22, 2022

(65) Prior Publication Data
US 2024/0278898 A1    Aug. 22, 2024

(30) Foreign Application Priority Data

Jun. 18, 2021   (AT) .............................. A 50493/2021

(51) Int. Cl.
*B64C 1/14* (2006.01)
*E05F 15/622* (2015.01)

(52) U.S. Cl.
CPC .............. *B64C 1/1461* (2013.01); *B64C 1/14* (2013.01); *B64C 1/1438* (2013.01); *B64C 1/1469* (2013.01); *E05F 15/622* (2015.01)

(58) Field of Classification Search
CPC .... E05F 15/622; E05F 15/652; B64C 1/1438; B64C 1/1469; B64C 1/1461; B64C 1/14
See application file for complete search history.

(56) References Cited

U.S. PATENT DOCUMENTS

H1362  H  * 10/1994  Herrmann ............... B66B 13/08
                                                  187/324
9,260,175  B2 * 2/2016  Cabourg ................. E05C 17/60
(Continued)

FOREIGN PATENT DOCUMENTS

DE          10022715 A1    12/2000
DE       202011102484 U1   10/2011
(Continued)

OTHER PUBLICATIONS

ISA European Patent Office, International Search Report Issued in Application No. PCT/AT2022/060203, Sep. 9, 2022, WIPO, 4 pages.

*Primary Examiner* — Justin B Rephann
(74) *Attorney, Agent, or Firm* — McCoy Russell LLP (57) ABSTRACT

The invention relates to an aircraft sliding door comprising: a door leaf, which is slidable between a closed position and an open position in the opening and closing direction, respectively, and has a door top part and a door bottom part, which are arranged in a pulled-out state in the closed position and in a pushed-together state in the open position; a guide rail; and a drive device having an electric motor for assisting the movement of the door leaf from the open position to the closed position, wherein the drive device has a spindle that is connected to the electric motor and is inclined with respect to the opening and closing direction such that the door leaf is automatically transferred into the open position along the spindle when the electric motor is in a de-energised state.

10 Claims, 3 Drawing Sheets

(56) References Cited

U.S. PATENT DOCUMENTS

| | | | | |
|---|---|---|---|---|
| 10,252,809 | B2* | 4/2019 | Cabourg | B64D 25/00 |
| 2007/0261310 | A1* | 11/2007 | Porat | E05F 1/1091 |
| | | | | 49/343 |
| 2013/0019536 | A1* | 1/2013 | Cabourg | B64C 1/1438 |
| | | | | 49/404 |
| 2013/0020439 | A1 | 1/2013 | Cabourg | |
| 2019/0383068 | A1 | 12/2019 | Konrad | |

FOREIGN PATENT DOCUMENTS

| | | |
|---|---|---|
| EP | 2540616 B1 | 3/2017 |
| FR | 3050717 A1 | 11/2017 |
| WO | 9100823 A1 | 1/1991 |
| WO | 2018132856 A1 | 7/2018 |

* cited by examiner

AIRCRAFT SLIDING DOOR

CROSS REFERENCE TO RELATED APPLICATIONS

The present application is a U.S. National Phase of International Application No. PCT/AT2022/060203 entitled "AIRCRAFT SLIDING DOOR," and filed on Jun. 17, 2022. International Application No. PCT/AT2022/060203 claims priority to Austrian Patent Application No. A 50493/2021 filed on Jun. 18, 2021. The entire contents of each of the above-listed applications are hereby incorporated by reference for all purposes.

TECHNICAL FIELD

The invention relates to an aircraft sliding door comprising:
- a door leaf, which is slidable between a closed position and an opened position in the opening and closing direction respectively, and has a door top part and a door bottom part, which are arranged in a pulled-out state in the closed position and in a pushed-together state in the opened position,
- a guide rail, inclined with respect to the opening and closing direction, for guiding the door leaf between the closed position and the opened position,
- a drive device having an electric motor for assisting the movement of the door leaf from the opened position to the closed position.

BACKGROUND AND SUMMARY

The invention further relates to an aircraft comprising:
an interior with a first spatial area and with a second spatial area,
an aircraft sliding door arranged between the first spatial area and the second spatial area of the interior.

From EP 2 540 616 B1 an aircraft sliding door ("pocket door") is known. The sliding door has a two-part door leaf, which is pushed together transversely to the opening direction when the door is opened and is thus stowed in a space-saving manner. The aircraft sliding door can be used to separate two spatial areas in the aircraft, the door leaf being stowed in an opened position in a pocket of an intermediate wall. For this purpose, the aircraft sliding door is adapted to the geometry inside the aircraft. The upper edge of the door frame is curved and thus adapted to the cross-section of the aircraft. The door leaf has a corresponding curvature so that the door opening can be completely closed by the door leaf. The door leaf has a door leaf top part and a door leaf bottom part, which are connected to linear guides. The linear guide of the door leaf top part is arranged so as to rise obliquely in the closing direction. This ensures that the door leaf top part, which is adapted to the curved top edge of the door opening, can move into the curvature from below, as a result of which complete closure of the door can be achieved. The linear guide of the bottom part of the door leaf is arranged so as to descend obliquely in the closing direction. As a result, the door leaf top part is moved upwards and into the interior of the door leaf top part, which is hollow in this area, when the door is opened. For power assistance, a gas pressure spring is provided, which supports the closing of the aircraft sliding door.

From FR 3 050 717 A1 a different type of separating device for separating an aircraft cabin is known.

Aircraft sliding doors are shown in WO 2018/132856 A1 and WO 91/00823 A1.

In EP 2 540 616 B1 electric motor-driven closing mechanisms are also mentioned, but they are described as disadvantageous because such closing mechanisms are no longer fully usable in the event of a failure of the power supply.

It is therefore the object of the invention to achieve a stowable sliding door of the type mentioned in the introduction, which at least alleviates or eliminates individual disadvantages of the prior art. Accordingly, an object of the invention is preferably to provide a sliding door that is simple and reliable to open and close and meets high safety standards with little structural effort.

The object is achieved by a sliding door having the features described herein.

According to a first aspect of the invention, the drive device has a spindle, in particular a ball screw spindle, which is connected to the electric motor and is inclined with respect to the opening and closing direction such that the door leaf is automatically transferred into the opened position along the spindle when the electric motor is in a de-energised state, wherein the drive device has a nut receiving the spindle, which travels along the spindle by rotating the spindle with the electric motor, and moves linearly along the spindle by rotating the spindle with the electric motor, wherein the nut is connected to a door suspension for the door top part via an entraining device. According to a second aspect of the invention, the drive device has a spindle, in particular a ball screw spindle, which is connected to the electric motor and is inclined with respect to the opening and closing direction such that the door leaf is automatically transferred into the opened position along the spindle when the electric motor is in a de-energised state, wherein the electric motor is rotatably mounted on a holding frame of the drive device, wherein the drive device comprises at least a first spring, which pushes the electric motor from a first state rotated in one direction in the direction of a neutral position, wherein the drive device has a second spring, which pushes the electric motor from a second state rotated in the other direction in the direction of the neutral position. According to a third aspect of the invention, the drive device has a spindle, in particular a ball screw spindle, which is connected to the electric motor and is inclined with respect to the opening and closing direction such that the door leaf is automatically transferred into the opened position along the spindle when the electric motor is in a de-energised state, wherein the electric motor is rotatably mounted on a holding frame of the drive device, wherein a device for detecting a torque overrun of the electric motor is provided, with which a blocked state of the door leaf can be ascertained during the transfer between the closed position and the opened position, wherein the device for detecting the torque overrun of the electric motor comprises a sensor, which detects a rotation of the electric motor due to the torque overrun, wherein the device for detecting the torque overrun of the electric motor comprises a triggering element connected in a rotationally fixed manner to the electric motor, which triggers the sensor when the electric motor is rotated due to the torque overrun. According to a fourth aspect of the invention, the drive device has a spindle, in particular a ball screw spindle, which is connected to the electric motor and is inclined with respect to the opening and closing direction such that the door leaf is automatically transferred into the opened position along the spindle when the electric motor is in a de-energised state, wherein the electric motor is rotatably mounted on a holding frame of the drive device, wherein a device for detecting a torque overrun of the electric motor is provided, with which a blocked state of the door leaf can be ascertained during the transfer between the closed position and the opened position, wherein the drive device comprises a control unit, which switches the electric motor to a de-energised state when the blocked state of the door leaf is detected.

In the opened position of the sliding door, with the passage opening released, the door top part and the door bottom part of the door leaf are pushed together transversely to the opening and closing direction, respectively. Since the door top part and the door bottom part are arranged in an overlapping manner in the opened position, the door leaf can be stowed in a space-saving manner in the opened position, in particular in an intermediate wall between two spatial areas of the aircraft interior. In the closed position, the door leaf is pulled out transversely to the closing direction in order to close the passage opening. The aircraft sliding door can be used, for example, to separate two spatial areas in the interior of an aircraft. The aircraft sliding door is therefore preferably adapted to the geometry of the interior. The upper edge of the upper door part is therefore preferably curved. Preferably, the door top part and the door bottom part are each connected to at least one guide rail. The at least one guide rail of the door top part is inclined downwards as seen in the opening direction. The end of the guide rail facing the passage opening is thus higher than the end of the guide rail facing away from the passage opening. This ensures that the door top part, which is adapted to the curved top edge of the door opening, can move into the curvature from below, as a result of which complete closure of the door can be achieved. At least one guide rail of the door bottom part is preferably arranged inclined upwards, as seen in the opening direction. Depending on the design, a locking device may be provided with which the door leaf can be locked in the closed position. To close the sliding door, the door leaf is connected to the electric motor of the drive device in order to close or open the sliding door. According to the invention, the drive device has the spindle, which is inclined relative to the (preferably horizontal) opening and closing direction, respectively, in the sliding plane at an angle of inclination other than 0° or 180°. The arrangement and design of the spindle is designed so that, in a de-energised state, i.e. in a state without power assistance, for example in the event of a failure of the power supply, the sliding door is transferred automatically, i.e. exclusively under the effect of gravity, from the closed position into the opened position in order to release the passage opening. The spindle is inclined downwards as seen in the opening direction. The end of the spindle facing the passage opening is thus higher than the end of the spindle facing away from the passage opening. The angle of inclination of the spindle with respect to the opening and closing direction is preferably from 25° to 45°, particularly preferably from 30° to 40°, for example substantially 34°. Preferably, the spindle is arranged substantially parallel to the guide rail of the door top part. The sliding door is thus automatically opened in the event of a power failure or an associated emergency, since gravity causes the sliding door to slide into the opened position. The door bottom part and the door top part are pushed together with the help of the guide rail. The door bottom part is preferably lighter than the door top part to ensure automatic sliding together. The sliding plane is at the same time the main extension plane of the sliding door. The spindle has an external thread which increases the distance to be covered along the spindle and thus decelerates the opening speed of the sliding door. In a particularly preferred embodiment, the sliding door has a substantially constant opening speed from the closed position to the opened position. Advantageously, the sliding door is thus gently opened. It is particularly preferred for the drive device to be able to transfer the sliding door from the opened state into the closed state and from the closed state into the opened state free of additional gas pressure springs and dampers. Such additional devices were necessary in known designs, e.g. with a toothed belt drive, in order to brake the sliding door during stowing by gravity in the last section of the movement.

For purposes of this disclosure, the location and direction indications, such as "horizontal," "vertical," "upwards," or "downwards", refer to the intended installed condition of the sliding door in the aircraft when the aircraft is oriented horizontally.

The electric motor is preferably a brushless DC motor.

The electric motor is preferably configured to rotate the spindle in order to transfer the sliding door from the opened position into the closed position, preferably also from the closed position into the opened position. Preferably, the electric motor can be connected to the spindle via a gear mechanism. With the gear mechanism, a motor speed of the electric motor can be translated into a drive speed of the spindle. The gear ratio between motor and drive speed is preferably from 1:1 to 1:10.

The spindle is preferably a ball screw spindle. In this embodiment, running grooves are incorporated in the spindle and the nut, which receive balls and thus produce a form fit between the spindle and the nut. Return channels are preferably provided in the nut, via which the balls are returned. The path of the balls is thus closed. A ball screw spindle is known, for example, from DE 100 22 715 B4. The nut is preferably connected to the door leaf in such a way that the movement of the nut along the spindle is converted into the opening or closing movement of the door leaf. Due to the interaction of the nut and the spindle, the opening speed in the de-energised state of the electric motor is decelerated to such an extent that additional damping elements, such as gas pressure springs, for damping the opening movement of the door leaf can preferably be dispensed with. Furthermore, the electric motor, in this case as a generator, can also brake.

A door suspension may be attached, for example, to a (preferably substantially vertical) longitudinal edge of the door top part. With the aid of the entraining device, the movement of the nut in the driven state of the electric motor is transmitted to the door suspension, which pulls the door leaf, in particular, from the closed position into the opened position.

For power transmission between the drive device and the door leaf, it is advantageous if the entraining device has an entraining element, in particular a entraining bolt, connected to the nut, and a receptacle connected to the door suspension. The entraining element, in particular an entraining bolt, transmits the movement of the nut along the spindle to the receptacle, which is connected to the door suspension in such a way that the door leaf can be closed, in particular also opened, with the aid of the drive device.

In a preferred embodiment, it is provided that
  the entraining element is movably connected to the receptacle on the door suspension in a first direction parallel to the door leaf and perpendicular to the longitudinal axis of the spindle and/or that
  the entraining element is movably connected to the receptacle on the door suspension in a second direction perpendicular to the door leaf and perpendicular to the longitudinal axis of the spindle, and/or that the entraining element is fixedly connected to the receptacle in a third direction parallel to the longitudinal axis of the spindle.

The mobility in the first and second directions helps to prevent wedging of the door leaf. Preferably, the degrees of freedom in the first and second directions, starting from the neutral position, each allow a movement of at least +/−2 millimetres (mm), in particular from 3 mm to 10 mm, for example, substantially +/−4 mm. Only in the third direction, parallel to the longitudinal axis of the spindle and thus in the direction of the movement of the nut along the spindle, is the entraining element fixedly connected to the receptacle, i.e. without play. This ensures an effective entrainment of the receptacle (and thus also of the door leaf). Furthermore, jerky movements of the door leaf along the third direction can be detected by external action and, if necessary, the closing of the sliding door can be interrupted.

Preferably, a holder makes it possible in a simple manner to transmit movements of the entraining element to the receptacle on the door leaf in a force-locking manner only in the third direction.

Blocking the door leaf could lead to damage to the sliding door, in particular the door leaf and/or the drive device, or to injury to a user. If a torque overrun is detected, the drive direction of an electric motor can be reversed or, if this is not possible, for example in the event of a software error, the sliding door can be de-energised, so that the sliding door is transferred into the opened position by gravity.

The electric motor can be rotated or pivoted about its drive axis due to the effective torque during operation of the electric motor. Damage to the electric motor or spindle due to increased torque can be avoided in this arrangement. Furthermore, an excessive torque can be inferred from the rotation of the motor, for example due to a blockage of the door.

In a preferred embodiment, starting from its neutral or central position, the electric motor is mounted so as to be rotatable in both directions about its drive axis. The electric motor is loaded in one direction when the sliding door is opened and in the other direction when the sliding door is closed. The two springs each pushes the electric motor into the neutral position and thus counteract the torque on the electric motor. The pivoting of the electric motor is proportional to the torque acting on it.

The pivoting or rotation of the electric motor is proportional to the torque acting on it. Thus, the torque overrun can be ascertained based on the rotation of the electric motor. The sensor detects when a certain angle of rotation is exceeded in order to ascertain a corresponding torque overrun.

By switching off the electric motor due to the torque overrun when the sliding door is blocked, the safety of the user in particular can be ensured.

Preferably, the spindle has a gear ratio with which a complete rotation of the spindle causes a movement of the door leaf in the closing and opening direction of less than 30 mm, in particular from 5 mm to 15 mm. The gear ratio increases the path along the external thread of the spindle compared to the feed of the nut along the longitudinal axis of the spindle.

Preferably, a first limit switch is provided for detecting the opened position of the door leaf and a second limit switch is provided for detecting the closed position of the door leaf. The two limit switches detect the respective end positions of the door leaf. The first and/or second limit switch may be connected to the control unit. Thus, triggering of the first or second sensor can be used to control the electric motor, in particular to switch off the electric motor.

In order to be able to release the access opening independently of the sliding mechanism in the event of exceptional circumstances, in particular in a dangerous situation, it is advantageous if at least one of the door top part and door bottom part is mounted so as to be pivotable about a pivot axis running substantially perpendicular to the predetermined path, the pivoting of the respective door part being blocked in the operating state by means of at least one securing element. This creates a known safety mechanism, which can be triggered, for example, if a certain pressure difference occurs between the inside and outside of the sliding door. Alternatively, the securing element can be unlocked by manual application of force, for example, if the sliding mechanism for opening the sliding door fails. Thus, in exceptional situations, the access opening can be released by swinging the sliding door open. The present invention is further explained with reference to an exemplary embodiment illustrated in the drawings.

DETAILED DESCRIPTION

Figure 1:
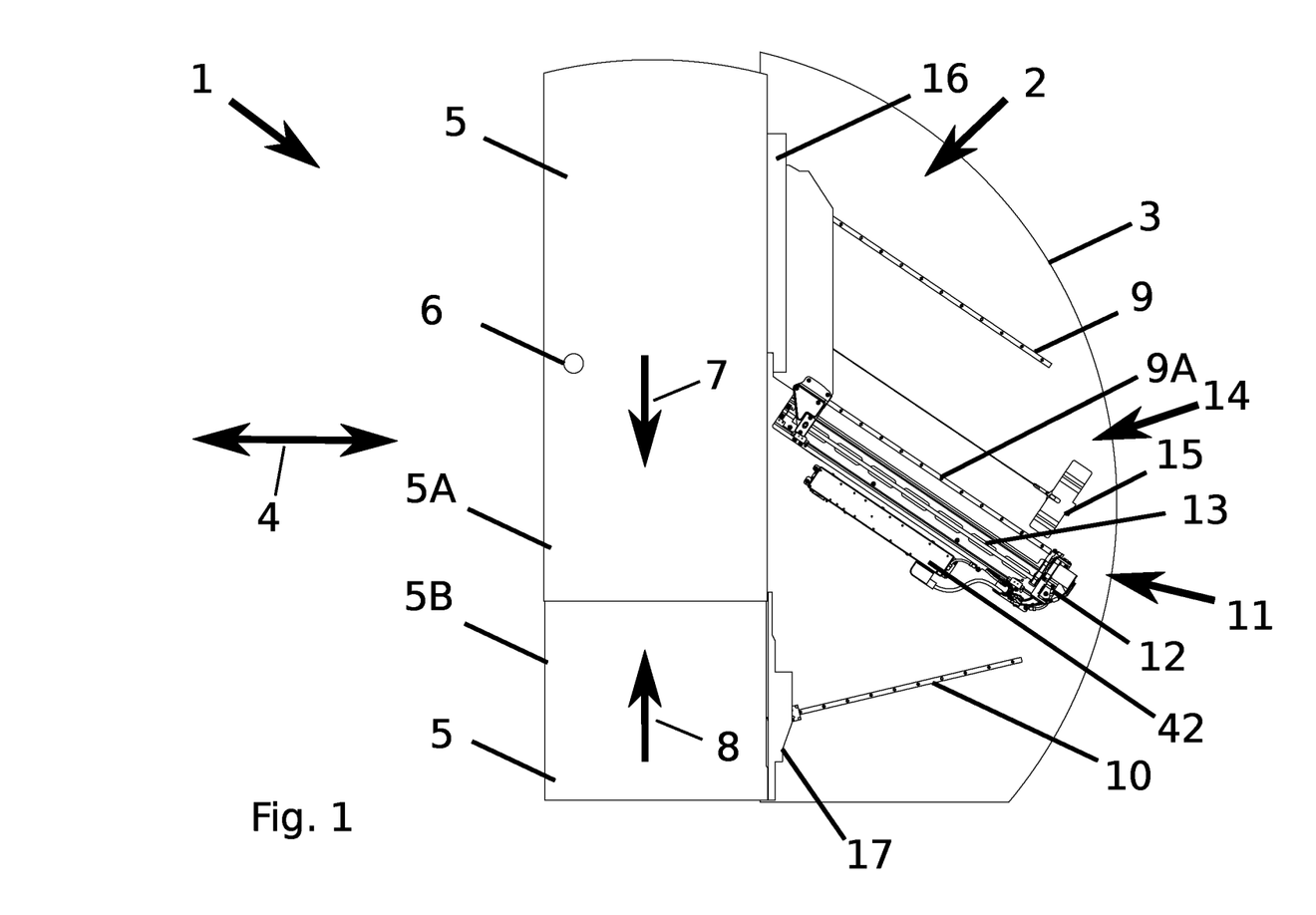
FIG. 1 shows an aircraft sliding door according to the invention with a drive device, in which an electric motor drives a spindle, wherein in the event of a failure of the power supply to the electric motor, the sliding door slides automatically into the opened position.

FIG. 1 shows a stowable aircraft sliding door 1 ("pocket door"), which in the embodiment shown is used in the passenger compartment of an aircraft. The sliding door 1 closes a passage opening within a door frame 2, which is designed, for example, as an intermediate wall of the aircraft. The door frame 2 has a border 3 which, in the embodiment shown, is curved in accordance with the inner contour of the aircraft fuselage. Thus, in addition to the passage opening, only a reduced stowed space is available, which requires an adaptation of the sliding door 1 in order to prevent the sliding door 1 from being blocked during the opening process by the curved border 3 of the frame structure of the door frame 2. The sliding door 1 is slidable along a horizontal path of the opening and closing direction 4, between the closed position shown in FIG. 1, in which the passage opening is closed, and an opened position (not shown), in which the passage opening is exposed. The sliding door 1 has two door parts which form the door leaf 5 and which, in the embodiment shown, are designed as a door top part 5A and a door bottom part 5B, respectively. In the closed position of the sliding door 1, the door parts 5 and 5B are arranged in a pulled-out position, in which the door parts 5A and 5B completely fill the passage opening.

In order to be able to stow the sliding door 1 next to the passage opening in a space-saving manner, the door parts 5A and 5B are pushed together perpendicular to the opening direction 4 when the sliding door 1 is opened, for example, by means of a handle 6. During closing, the door top part 5A is displaced downwards in the vertical direction (see arrow 7) and the door bottom part 5B is displaced upwards in the vertical direction (see arrow 8), so that the door parts 5A and 5B increasingly overlap during closing. When the opened position of the sliding door 1 is reached, the lower edges of the door parts 5A and 5B are arranged substantially at the same height, so that the total height of the sliding door 1 in the pushed-together stowed position corresponds to the height (or length) of the door top part 5A.

As can also be seen from FIG. 1, the door top part 5A is mounted in a slidable manner by means of a guide rail 9, which is attached to the frame structure of the door frame 2. In the embodiment shown, the door top part 5A is connected to a second guide rail 9A, which runs parallel to the guide rail 9, in order to increase stability. The door bottom part 5B is correspondingly slidable by means of a guide rail 10 fastened to the frame structure of the door frame 2.

As can also be seen from FIG. 1, the guide rails 9, 9A, with which the door top part 5A is mounted in a slidable manner, run at a first angle of inclination to the sliding direction 4 of the sliding door 1. The angle of inclination of the guide rails 9, 9A causes the door top part 5A to be guided downwards in the direction of the arrow 7 when the sliding door 1 is opened. The guide rail 10 of the door bottom part 5B is correspondingly inclined at a second angle of inclination to the horizontal path 4 of the sliding door 1, which causes the door bottom part 5B to be guided upwards in the direction of the arrow 8 when the sliding door 1 is opened. In this case, the guide rails 9, 9A, 10 are arranged to converge in the direction of the sliding direction 4, with the result that, when the sliding door 1 is opened, the door parts 5A and 5B are displaced in opposite directions until the pushed-together stowed position is reached. In the embodiment shown, the parallel guide rails 9, 9A of the door top part 5A have a course steeper than that of the guide rail 10 of the door bottom part 5B. In this manner, during the transfer into the stowed position, the door top part 5A is displaced downwards by a longer distance in the direction of the arrow 7 than the door bottom part 5B is displaced upwards in the direction of the arrow 8. The first angle of inclination of the guide rails 9, 9A of the door top part 5A can be, for example, substantially 34°, wherein the angle of inclination of the guide rail 10 of the door bottom part 5B can be, for example, substantially 13°.

As can also be seen from FIG. 1, the door top part 5A is coupled to a drive device 11 in order to automatically transfer the door parts 5A and 5B from the opened position into the closed position. For this purpose, the drive device 11 has an electric motor 12. The electric motor 12 drives a spindle 13, which transfers the door leaf 5 from the opened position into the closed position. The spindle 13 is in turn inclined at a third angle of inclination to the horizontal, as a result of which the door leaf 5 is independently transferred into the opened position along the spindle 13 in a de-energised state of the electric motor 12. In the embodiment shown, the third angle of inclination corresponds to the first angle of inclination of the guide rails 9, 9A.

The sliding door 1 also has a latching mechanism 14 with a latching unit 15 attached to the frame structure of the door frame 2, which forms a latching receptacle for a corresponding latching element (not shown) connected to a door suspension 16 of the door top part 5A. When the opened position of the sliding door 1 is reached, the latching element is latched in the latching receptacle of the latching unit 15. The door bottom part is fixed to another door suspension 17.

Figure 2:
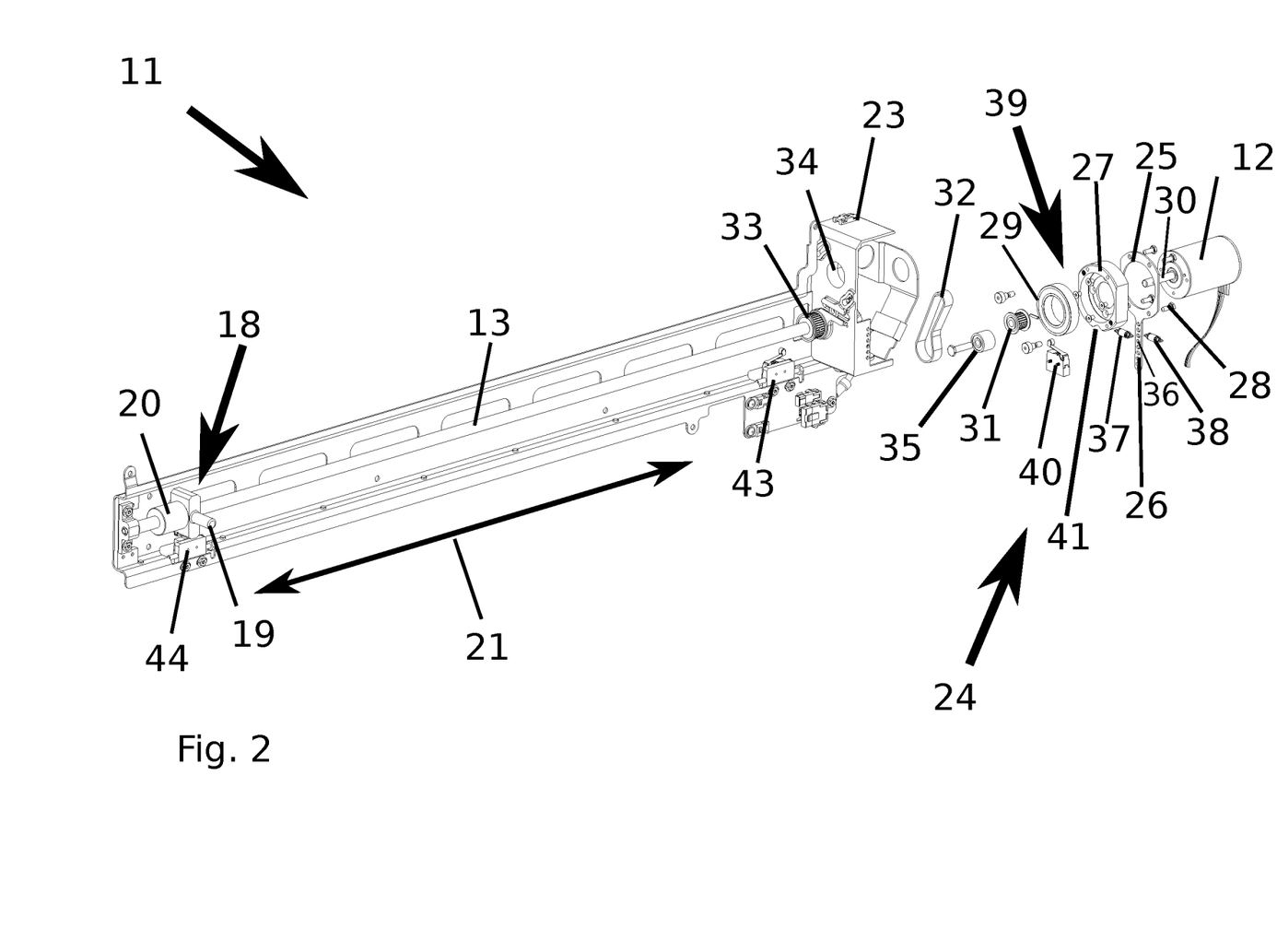
FIG. 2 shows the drive device of the aircraft sliding door according to FIG. 1 in an exploded view.

FIG. 2 shows the drive device 11 of FIG. 1. The electric motor 12 can be seen, which drives the spindle 13, here designed as a ball screw spindle. A nut 20, in this case a ball screw nut, is arranged on the spindle. Balls (not shown) are arranged in running grooves between the spindle 13 and the nut 20, with which the movement of the spindle 13 is implemented. These balls move axially as the spindle 13 rotates. The balls are returned through return channels in the nut 20 and a circuit is created.

In order to transfer the sliding door 1 from the opened position to a closed position, the electric motor 12 rotates the spindle 13, whereby the nut 20 is moved along the longitudinal direction 21 of the spindle 13.

The nut 20 is connected to the door top part 5A via an entraining device 18. The entraining device 18 has an entraining element connected to the nut 20, in the exemplary embodiment shown an entraining bolt 19, and a receptacle 22 connected to the door suspension (see FIG. 3).

The spindle 13 has a gear ratio such that a complete rotation of the spindle 13 causes a movement of the door leaf 5 in the closing and opening direction along the opening and closing direction 4 respectively of, for example, substantially 10 mm. For this purpose, the spindle 13 has an external thread which interacts with the nut 20 via the balls. The pitch of the thread and the diameter of the spindle 13 influence the gear ratio.

As can also be seen from FIG. 2, the drive device has a stationary holding frame 23, on which the spindle 13 is rotatably mounted. In addition, a motor assembly 24 is rotatably or pivotably mounted on the holding frame 23. The motor assembly 24 has the electric motor 12 arranged on a bearing 29. Provided between the electric motor 12 and the bearing 29 is a holder 25 with a downwardly projecting stud 26, the function of which is described further below. The individual components are fixed to one another by means of screws 28. The bearing 29 is arranged in a bearing housing 27. A driven shaft 30 of the electric motor 12 is connected to the spindle 13 via a gear mechanism. In the embodiment shown, the gear mechanism is formed by a first toothed belt pulley 31 and a second toothed belt pulley 32, which are connected to one another via a toothed belt 33. The driven shaft 30 is connected to the first toothed belt pulley 31. By means of the belt 33, the torque is transmitted from the first toothed belt pulley 31 to the second toothed belt pulley 32, which is connected to the spindle 13. The second toothed belt pulley 32 has a larger diameter than the first toothed belt pulley 31, as a result of which a gear ratio of, for example, 1:2 is achieved between the motor speed of the driven shaft 30 of the electric motor 12 and the drive speed of the spindle 13. The toothed belt 33 is tensioned with the aid of a tensioning wheel 35.

The driven shaft 30 protrudes through a passage 34 of the holding frame 23. The holding frame 23 is connected to the supporting frame of the door frame 2.

As can also be seen from FIG. 2, the holder 25 has individual bores 36 on the stud 26, which are arranged at different distances from the centre point of the holder 25. Two springs 37, 38, which are each connected to the holding frame 23, engage in one of these bores 36. A first spring 37 pushes the electric motor 12 from a state pivoted in one direction in the direction of a neutral position. A second spring 38 pushes the electric motor 12 from a second state pivoted in the other direction in the direction of the neutral position. Thus, the springs 37, 38 lead to a neutral position of the electric motor 12 or the motor assembly 24. When torque acts on the electric motor 12, the motor assembly 24 rotates about the axis of the driven shaft 30 against the springs 37, 38 until a balanced state between torque and spring force is achieved. The rotation of the electric motor 12 is thus proportional to the torque acting on the electric motor 12.

As can also be seen from FIG. 2, a device 39 for detecting a torque overrun of the electric motor 12 is provided, with which a blocked state of the door leaf 5 can be ascertained during the transfer between the closed and the opened position. The device 39 for detecting the torque overrun has a sensor 40, which detects a pivoting of the electric motor 12 due to the torque overrun. For this purpose, a trigger element 41, in particular a cam, connected to the electric motor 12 in a rotationally fixed manner is provided. The triggering element 41 triggers the sensor 40 when the electric motor 12 is pivoted due to the torque overrun. The torque overrun is ascertained based on the rotation of the motor assembly 24 and thus also of the electric motor 12. The rotation depends on the torque and the spring force, the spring force in turn being determined by the characteristics of the springs 37, 38 and the deflection of the springs 37, 38. Therefore, the triggering torque is adjustable through the bore 36 in which the springs 37, 38 engage. At a constant torque to the electric motor 12, the bores 36 at the outer end of the stud 26 result in less rotation of the motor assembly 24 than bores 36 located further inward. If the torque overrun is detected, the electric motor may be switched to a de-energised state by a control unit 42 (see FIG. 1). In this case, the sliding door 1 automatically moves into the opened position.

As can also be seen in FIG. 2, a first limit switch 43 is provided for detecting the opened position of the door leaf 5 and a second limit switch 44 is provided for detecting the closed position of the door leaf.

Figure 3:
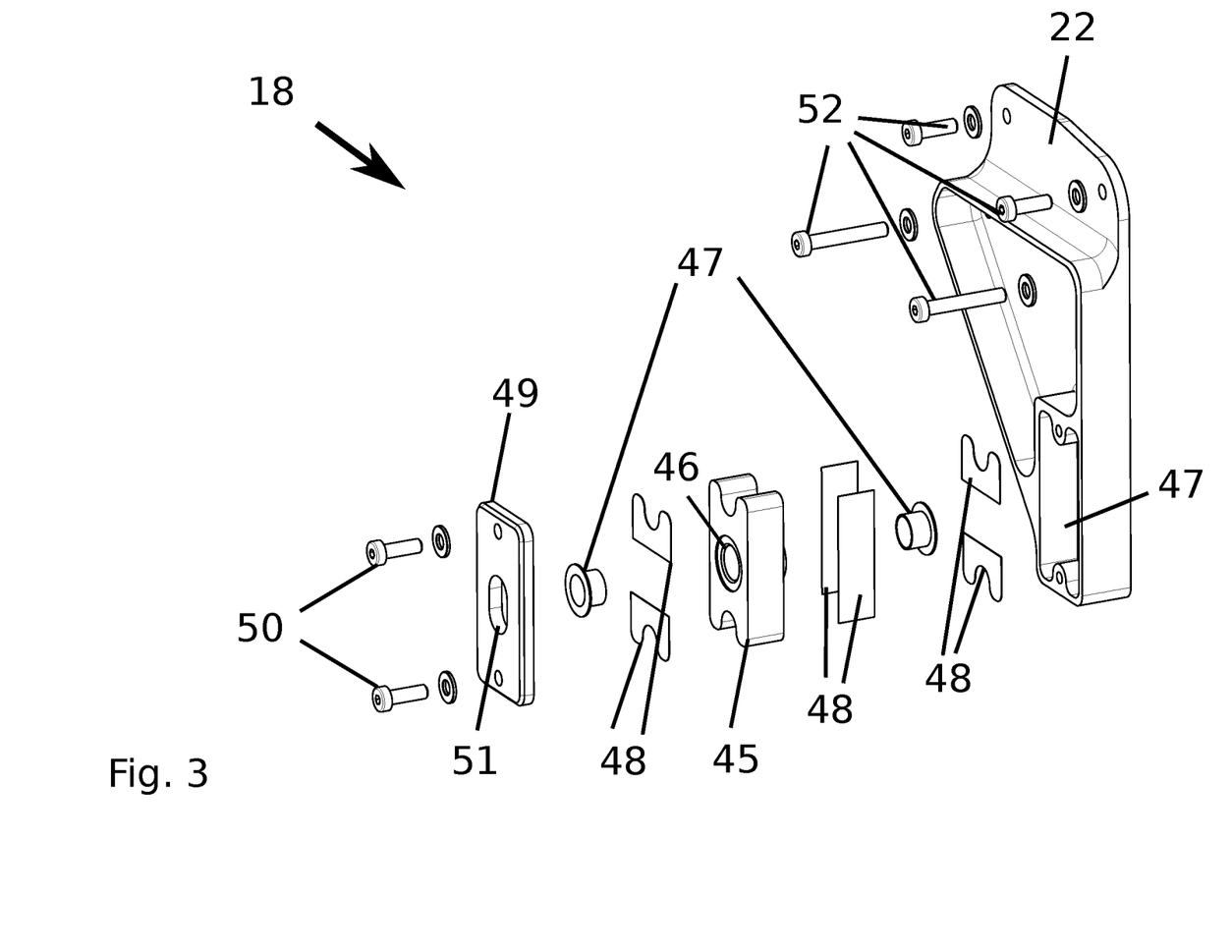
FIG. 3 shows an exploded view of a receptacle connected to a door suspension, to which the movement of a nut of the drive device travelling along the spindle is transmitted.

FIG. 3 shows an entraining device 18, which receives the entraining bolt 19 on the nut 20 in the receptacle 22 connected to the door leaf 5 or the door top part 5A.

The entraining bolt 19 protrudes into the receptacle 22. A holder 45, which has a central bore 46, is provided in the receptacle 22. The entraining bolt 19 is received by a bushing, which in turn is received in the central bore 46 of the holder 45. The holder 45 is received in a recess 47 of the receptacle 22.

FIG. 3 further shows Teflon strips 48 that reduce the friction between the holder 45 and an inner wall of the receptacle 22 in the area of the recess 47. The holder 45 is fixed in the entraining device 18 by means of a cover plate 49. Screws 50 are provided for this purpose. The cover plate 49 has an elongated hole 51, which ensures that the holder 45 can move in the recess 47. The holder 45 has a first play in the recess 47 in a first direction parallel to the door leaf 5 and perpendicular to the longitudinal axis of the spindle 13. In a third direction along the longitudinal axis of the spindle 13, the holder 45 has no play in the recess 47. The entraining bolt 19 is movably arranged on the holder 45 in a second direction with a second play. The second direction coincides with the longitudinal axis of the entraining bolt 19 and is thus normal to the main plane of extension of the door leaf 5 and normal to the longitudinal axis of the spindle 13. The Teflon strips 48 substantially do not affect the first and second play.

The entraining device 18 is connected to the door suspension 16 of the door top part 5A by means of further screws 52.

The invention claimed is:

1. An aircraft sliding door, comprising:
a door leaf, which is slidable between a closed position and an opened position in an opening and closing direction respectively, and has a door top part and a door bottom part, which are arranged in a pulled-out state in the closed position and in a pushed-together state in the opened position,
a guide rail, inclined with respect to the opening and closing direction, for guiding the door leaf between the closed position and the opened position, and
a drive device having an electric motor for assisting the movement of the door leaf from the opened position to the closed position,
wherein the drive device comprises a spindle which is connected to the electric motor and is inclined with respect to the opening and closing direction such that the door leaf is independently transferred into the opened position along the spindle when the electric motor is in a de-energized state,
wherein the drive device comprises a nut receiving the spindle, which travels along the spindle by rotating the spindle with the electric motor,
wherein the nut is connected to a door suspension for the door top part via an entraining device, and
wherein the entraining device comprises an entraining element connected to the nut, and a receptacle connected to the door suspension.

2. The aircraft sliding door according to claim 1, wherein the entraining element is movably connected to the receptacle on the door suspension in a first direction parallel to the door leaf and perpendicular to the longitudinal axis of the spindle, and/or wherein
the entraining element is movably connected to the receptacle on the door suspension in a second direction perpendicular to the door leaf and perpendicular to the longitudinal axis of the spindle, and/or wherein
the entraining element is fixedly connected to the receptacle in a third direction parallel to the longitudinal axis of the spindle.

3. The aircraft sliding door according to claim 2, wherein the receptacle has a recess in which a holder for the entraining element is arranged so as to be movable in the first direction and substantially immovable in the third direction, the entraining element being arranged on the holder so as to be movable in the second direction.

4. An aircraft sliding door comprising:
a door leaf, which is slidable between a closed position and an opened position in an opening and closing direction respectively, and has a door top part and a door bottom part, which are arranged in a pulled-out state in the closed position and in a pushed-together state in the opened position,
a guide rail, inclined with respect to the opening and closing direction, for guiding the door leaf between the closed position and the opened position, and
a drive device having an electric motor for assisting the movement of the door leaf from the opened position to the closed position,
wherein the drive device comprises a spindle which is connected to the electric motor and is inclined with respect to the opening and closing direction such that the door leaf is independently transferred into the opened position along the spindle when the electric motor is in a de-energized state,
wherein the electric motor is rotatably mounted on a holding frame of the drive device, and
wherein the drive device comprises at least a first spring, which pushes the electric motor from a first state rotated in one direction in the direction of a neutral position, wherein the drive device has a second spring, which pushes the electric motor from a second state rotated in the other direction in the direction of the neutral position.

5. An aircraft sliding door comprising:
a door leaf, which is slidable between a closed position and an opened position in an opening and closing direction respectively, and has a door top part and a door bottom part, which are arranged in a pulled-out state in the closed position and in a pushed-together state in the opened position,
a guide rail, inclined with respect to the opening and closing direction, for guiding the door leaf between the closed position and the opened position, and
a drive device having an electric motor for assisting the movement of the door leaf from the opened position to the closed position,
wherein the drive device comprises a spindle which is connected to the electric motor and is inclined with respect to the opening and closing direction such that the door leaf is independently transferred into the opened position along the spindle when the electric motor is in a de-energised state,
wherein a device for detecting a torque overrun of the electric motor is provided, with which a blocked state of the door leaf can be ascertained during the transfer between the closed position and the opened position,
wherein the device for detecting the torque overrun of the electric motor comprises a sensor, which detects a rotation of the electric motor due to the torque overrun, and
wherein the device for detecting the torque overrun of the electric motor comprises a triggering element connected in a rotationally fixed manner to the electric motor, which triggers the sensor when the electric motor is rotated due to the torque overrun.

6. An aircraft sliding door comprising:
a door leaf, which is slidable between a closed position and an opened position in an opening and closing direction respectively, and has a door top part and a door bottom part, which are arranged in a pulled-out state in the closed position and in a pushed-together state in the opened position,
a guide rail, inclined with respect to the opening and closing direction, for guiding the door leaf between the closed position and the opened position, and
a drive device having an electric motor for assisting the movement of the door leaf from the opened position to the closed position,
wherein the drive device comprises a spindle which is connected to the electric motor and is inclined with respect to the opening and closing direction such that the door leaf is independently transferred into the opened position along the spindle when the electric motor is in a de-energized state,
wherein a device for detecting a torque overrun of the electric motor is provided, with which a blocked state of the door leaf can be ascertained during the transfer between the closed position and the opened position, and
wherein the drive device comprises a control unit, which switches the electric motor to a de-energised state when the blocked state of the door leaf is detected.

7. The aircraft sliding door according to claim 6, wherein the spindle comprises a gear ratio with which a complete rotation of the spindle causes a movement of the door leaf in the closing and opening direction respectively of less than 30 mm.

8. The aircraft sliding door according to claim 6, wherein a first limit switch is provided for detecting the opened position of the door leaf and a second limit switch is provided for detecting the closed position of the door leaf.

9. An aircraft comprising:
an interior with a first spatial area and with a second spatial area,
an aircraft sliding door according to claim 6, which is arranged between the first spatial area and the second spatial area in the interior.

10. The aircraft sliding door according to claim 6, wherein the spindle is a ball screw spindle.

* * * * *